(12) United States Patent
Takase (10) Patent No.: US 7,597,622 B2
(45) Date of Patent: Oct. 6, 2009

(54) GAME DEVICE, COMPUTER CONTROL METHOD, AND COMPUTER-READABLE INFORMATION STORAGE MEDIUM

(75) Inventor: Yasumi Takase, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 340 days.

(21) Appl. No.: 11/087,580

(22) Filed: Mar. 24, 2005

(65) Prior Publication Data

US 2005/0221892 A1    Oct. 6, 2005

(30) Foreign Application Priority Data

Mar. 31, 2004   (JP)   ............... 2004-108015

(51) Int. Cl.
*A63F 9/24* (2006.01)
*A63F 13/00* (2006.01)
(52) U.S. Cl. .................... 463/33; 463/30; 463/43; 463/32; 463/31
(58) Field of Classification Search ............ 463/1, 463/4–8, 30–33, 40, 42; 345/619, 629, 630, 345/632, 634, 646
See application file for complete search history.

(56) References Cited

U.S. PATENT DOCUMENTS

| | | | | |
|---|---|---|---|---|
| 4,710,873 | A | * | 12/1987 | Breslow et al. ............... 463/31 |
| 5,553,864 | A | * | 9/1996 | Sitrick ............... 463/31 |
| 5,595,389 | A | * | 1/1997 | Parulski et al. ............... 463/31 |
| 5,830,065 | A | * | 11/1998 | Sitrick ............... 463/31 |
| 6,155,924 | A | * | 12/2000 | Nakagawa et al. ............... 463/4 |

(Continued)

FOREIGN PATENT DOCUMENTS

EP    0 933 728 A    8/1999

(Continued)

OTHER PUBLICATIONS

"Tony Hawk's Underground" for Sony Playstation 2, released Oct. 27, 2003, Gamespot Editor's Review, Oct. 28, 2003, from http://reviews.cnet.com/playstation-2-games/tony-hawk-s-underground/4505-9581_7-30984233.html.*

(Continued)

*Primary Examiner*—John M Hotaling
*Assistant Examiner*—Steven J. Hylinski
(74) *Attorney, Agent, or Firm*—Sughrue Mion, PLLC (57) ABSTRACT

A game device including a player image acquisition section 50 for receiving an image of a player from image capture means in charge of image capturing of the player, a game processing section 54 for executing various types of games, and in each of the games, outputting and displaying a game image as a combination result of the image of the player captured by the image capture means and a basic game image corresponding to the game, and a reference image generation section 58 for generating a plurality of reference game images by combining the image of the player captured by the image capture means and each of a plurality of reference basic game images corresponding to at least a part of the games, and outputting and displaying a reference image including the reference game images. With such a game device, the player is helped to understand play requirements relating to image capturing by the image capture means on a game basis.

5 Claims, 8 Drawing Sheets

U.S. PATENT DOCUMENTS

| | | | |
|---|---|---|---|
| 6,283,858 B1 * | 9/2001 | Hayes et al. | 463/31 |
| 6,285,381 B1 * | 9/2001 | Sawano et al. | 715/726 |
| 6,306,039 B1 * | 10/2001 | Kaji et al. | 463/42 |
| 6,435,969 B1 * | 8/2002 | Tanaka et al. | 463/44 |
| 6,540,615 B2 * | 4/2003 | Tanaka et al. | 463/44 |
| 6,583,792 B1 * | 6/2003 | Agnew | 345/660 |
| 6,664,956 B1 * | 12/2003 | Erdem | 345/419 |
| 6,677,967 B2 * | 1/2004 | Sawano et al. | 715/839 |
| 6,749,514 B1 * | 6/2004 | Moriwaki et al. | 463/43 |
| 6,894,686 B2 * | 5/2005 | Stamper et al. | 345/419 |
| 6,970,177 B2 * | 11/2005 | Yamada et al. | 345/629 |
| 2002/0082082 A1 * | 6/2002 | Stamper et al. | 463/32 |
| 2003/0100363 A1 * | 5/2003 | Ali | 463/30 |
| 2003/0214518 A1 * | 11/2003 | Yamada et al. | 345/629 |

FOREIGN PATENT DOCUMENTS

| | | | |
|---|---|---|---|
| EP | 1 351 172 A | 10/2003 | |
| EP | 1 365 360 A2 | 11/2003 | |
| JP | 10-156039 A | 6/1998 | |
| JP | 10-230079 A | 9/1998 | |
| JP | 11-066272 A | 3/1999 | |
| JP | 2000-069467 A | 3/2000 | |
| JP | 2003-334384 A | 11/2003 | |

OTHER PUBLICATIONS

"Perfect Dark Review", for Nintendo 64, by Matt Casamassina of IGN.com, May 19, 2000, from http://ign64.ign.com/articles/153/153906pt.html.*

Super Mario All-Stars for the SNES system, copyright 1993 Nintendo. Screen shots sourced from http://www.mobygames.com/game/snes/super-mario-all-stars/screenshots/gameShotId,26862/.*

Enterbrain, Inc., Play Guide "EyeToy : Play" Shukan Famitsu, vol. 19, No. 9., pp. 120 to 121, date Feb. 27, 2004.

* cited by examiner

GAME DEVICE, COMPUTER CONTROL METHOD, AND COMPUTER-READABLE INFORMATION STORAGE MEDIUM

BACKGROUND OF THE INVENTION

The present invention relates to game devices, computer control methods, and computer-readable information storage media and, more specifically, to a game of showing a player's images captured by image capture means.

In recent years, electronic game systems, utilizing electronic cameras to capture a player's moving images or still images for combination with game images prior to image output, have been receiving attention. With such game systems, the player can feel as if they are actually in the world of the game, thereby arousing their interest toward the game.

The issue here is that such game systems may cause problems if various types of games are available therein, and if the player is supposed to make a selection as to which game to play. That is, the games may not always use the same images of the player for the same purpose, e.g., some game may use the player's whole body images or only the player's head part images, the player's images may move forward and backward and/or right and left during a game play, or the like. This is why the games have each different play requirements, e.g., image capture range in need, and play space. This may therefore cause an input failure of any needed player's images for some game, resultantly preventing smooth game play. In view thereof, it is considered desirable to help the player understand play requirements relating to image capturing for every available game before the player makes a game selection.

SUMMARY OF THE INVENTION

The present invention is proposed in consideration of the above problems, and an object thereof is to provide a game device capable of helping players understand play requirements relating to image capturing by image capture means for every available game, and a computer control method, and a computer-readable information storage medium.

To achieve the above object, a first aspect of the present invention is directed to a game device which includes: image capture means for capturing an image of a player; game execution means for executing various types of games, and in each of the games, outputting and displaying a game image as a combination result of the image of the player captured by the image capture means and a basic game image corresponding to the game; reference game image generation means for generating a plurality of reference game images by combining the image of the player captured by the image capture means and each of a plurality of reference basic game images corresponding to at least a part of the games; and reference image output means for outputting and displaying a reference image including the reference game images.

A second aspect of the present invention is directed to a control method of a computer (e.g., game unit for home use, game unit for commercial use, portable game unit, mobile phone, personal digital assistant, personal computer, and server computer. This is also applicable below). The method includes steps of: capturing an image of a player; executing a game selected out of plural games, and in each of the games, outputting and displaying a game image as a combination result of the image of the player and a basic game image corresponding to the game; generating a plurality of reference game images by combining the image of the player and each of a plurality of reference basic game images corresponding to at least a part of the games; and outputting and displaying a reference image including the reference game images.

A third aspect of the present invention is directed to a computer-readable information storage medium storing a program for activating a computer. The program operates as: game execution means for executing various types of games, and in each of the games, outputting and displaying a game image as a combination result of an image of a player captured by image capture means and a basic game image corresponding to the game; reference game image generation means for generating a plurality of reference game images by combining the image of the player captured by the image capture means and each of a plurality of reference basic game images corresponding to at least a part of the games; and reference image output means for outputting and displaying a reference image including the reference game images.

In the present invention, various types of games are executable. In each of the games, an image of a player is combined together with a basic game image corresponding to the game, and the resulting image is output for display as a game screen. Here, the image of the player is captured by image capture means exemplified by an electronic camera for capturing moving images or still images. Moreover, in the present invention, a plurality of reference basic game images corresponding to at least a part of the games are used. In the present invention, such reference basic game images are each combined with the image of the player captured by the image capture means so that a plurality of reference game images are generated. These reference game images are output for display as a part of a reference image.

According to the present invention, the player can see a reference game image as a combination result of the image of the player with the reference basic game image corresponding to a part or all of the games. Accordingly, this helps the player understand the play requirements relating to the image capture means.

In an embodiment of the present invention, specification means is further included for specifying one of the reference game images included in the reference image, and the game execution means executes one of the games corresponding to the specified reference game image. With such a structure, for game play, the player can see a plurality of reference game images to select any game that seems satisfying play requirements.

In another embodiment of the present invention, the reference basic game image is generated based on the reference game image. The reference game image generation means includes reference basic game image storage means for storing the generated reference basic game image, and combines the image of the player together with the reference basic game image stored in the reference basic game image storage means. The reference basic game image may be a reference game image itself. Assuming that the basic game image includes moving images such as moving pictures, animation images, or images to be generated by real-time computer graphics processing, an image (still image) at any arbitrary timing may be regarded as a reference basic game image. Alternatively, animation images being the moving images of an arbitrary time period may be regarded as reference basic game images. Still alternatively, a result of a predetermined process applied to the basic game image may serve as a reference basic game image. According to the present embodiment, a reference game image is generated using images previously stored in the basic game image storage means, and the reference game image can therefore be generated with a very light processing load.

In this embodiment, in an alternative structure, the game execution means may include means for sequentially generating the basic game image by two-dimensional (2D) or three-dimensional (3D) image processing. Also, in the reference basic game image storage means, at least one of the basic game images to be sequentially generated by the generation means may be generated in advance for storage as the reference basic game image. With this being the case, even if the game is under a heavy processing load, the reference game images for the game can be displayed with a very light processing load. Note here that in the 2D image processing, images of elements such as game characters are placed at positions calculated by following a game program, and based thereon, the game screen is sequentially generated. In the 3D image processing, a virtual 3D space including objects and viewpoints is viewed from the viewpoints, and such images are sequentially generated for display as game screens.

DETAILED DESCRIPTION OF THE INVENTION

Figure 1:
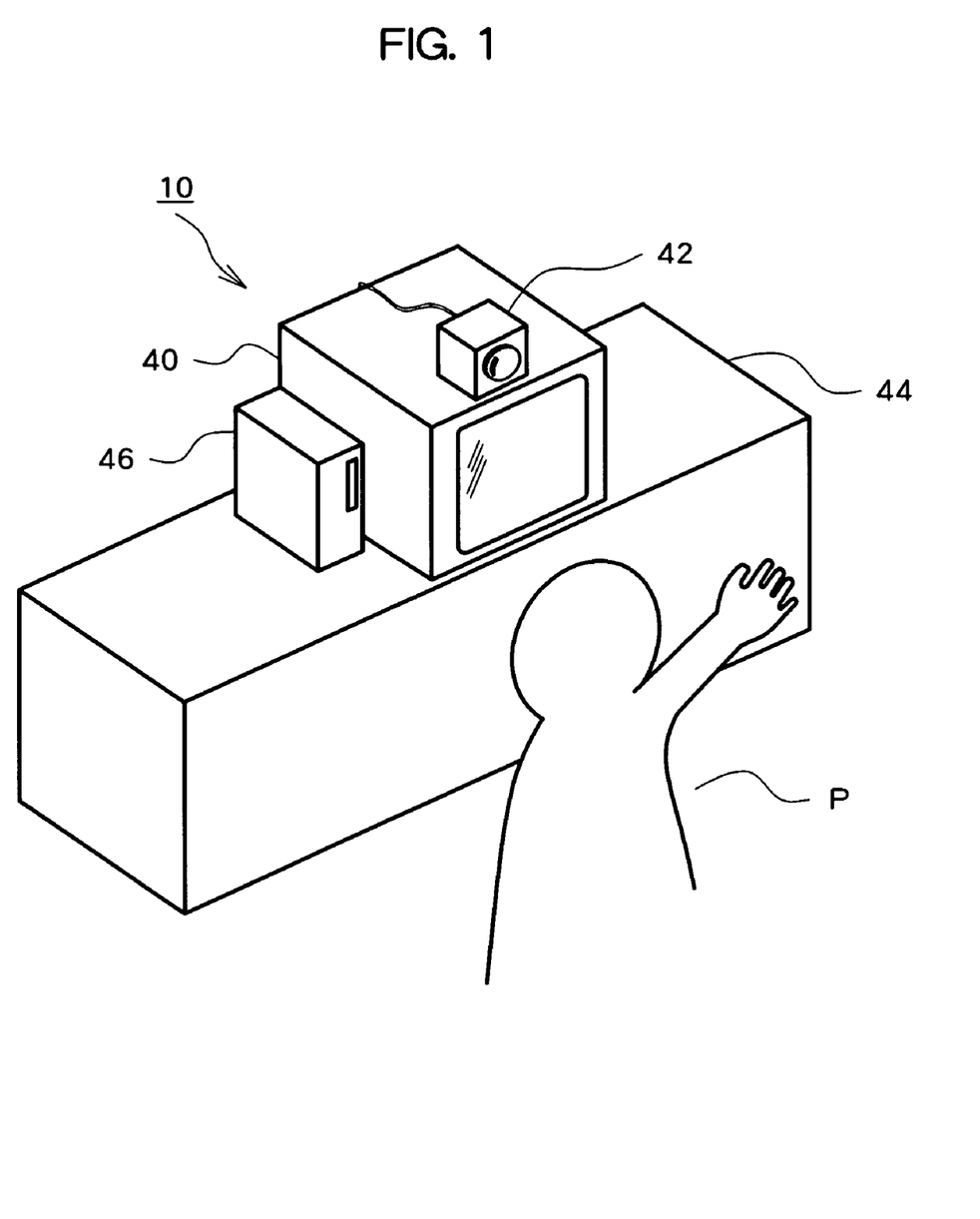
FIG. 1 is a diagram showing the usage condition of a game device of an embodiment of the present invention.

FIG. 1 is a perspective view illustrating a state in which a player plays a game using a game device of a preferred embodiment of the present invention. As shown in the drawing, a game device 10 includes a home television receiver 40, a camera unit 42, and a home game unit 46, which are for implementing various types of games. The home television receiver 40 and the home game unit 46 are both placed on a cabinet 44, and the camera unit 42 is placed on the home television receiver 40. The camera unit 42 is a digital camera with which images of a player P are captured in real time (on a predetermined time basis). Through a cable connection to the home game unit 46, the captured images of the player P (player images) are forwarded in real time from the camera unit 42 to the home game unit 46. The home game unit 46 is connected to the home television receiver 40, and displays game screens to be generated by the home game unit 46. Game music, game effects, and audio messages are output from a speaker equipped inside of the home game unit 46.

With the game device 10, when the player P moves his/her body entirely or partially in front of the camera unit 42, the movement amount is responsively calculated. Based on whether the calculated amount is equal to or more than a predetermined value, control is exercised over the game. For example, when the player P waves his/her hand at a predetermined position, the game is accordingly controlled so that the game score of the player P is updated. The game score is displayed on the home television receiver 40, or output in audio from the internally-equipped speaker.

Figure 2:
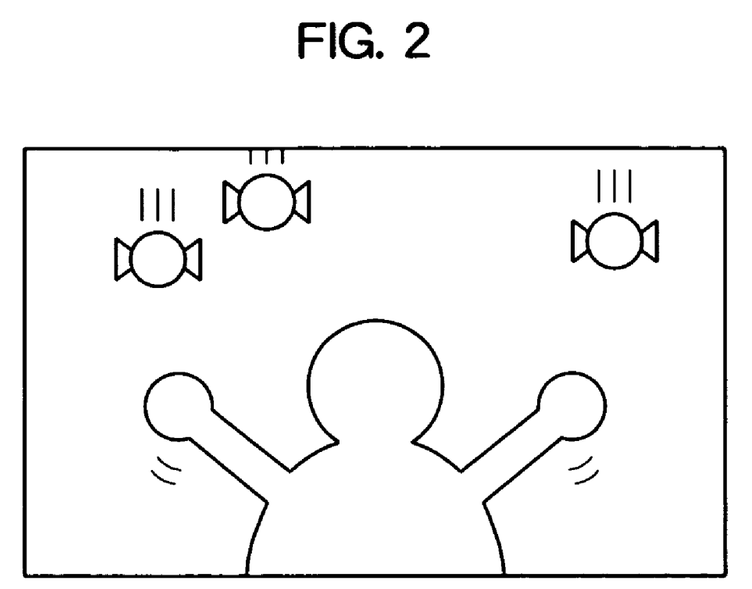
FIG. 2 is a diagram showing an exemplary game screen.
Figure 3:
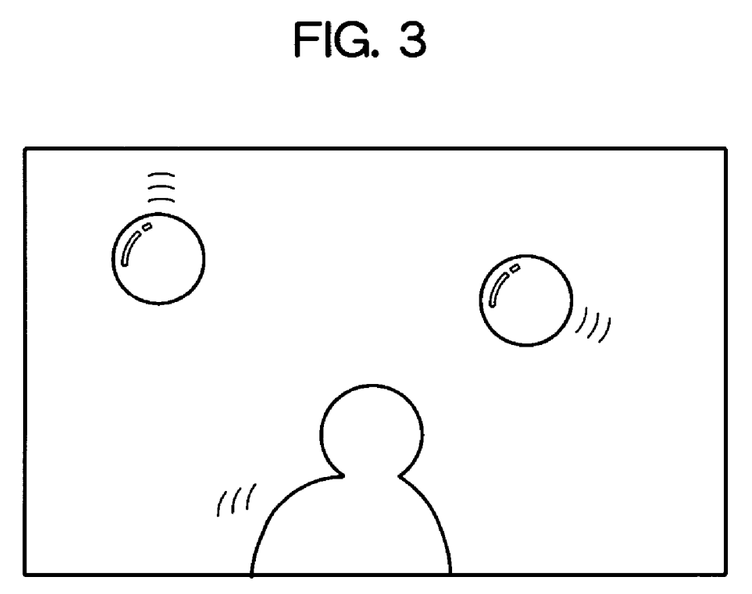
FIG. 3 is a diagram showing another exemplary game screen.
Figure 4:
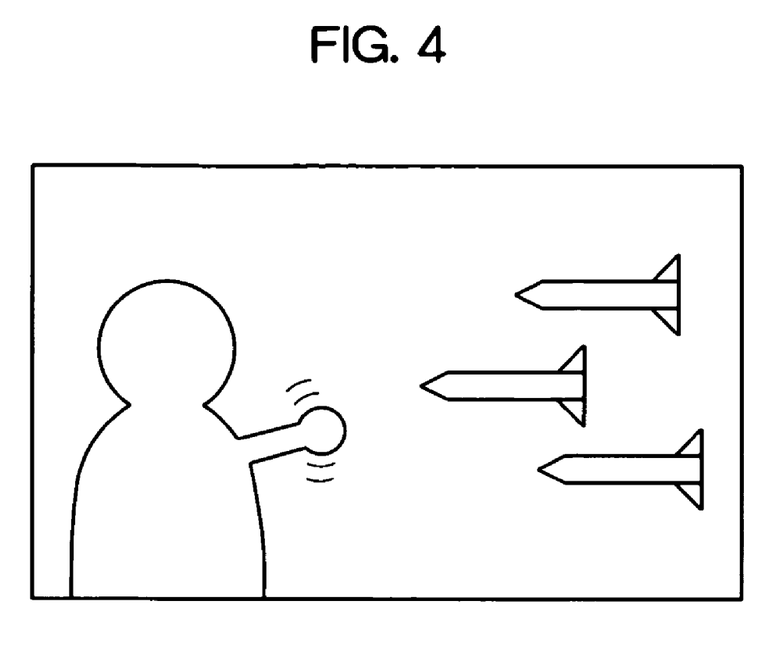
FIG. 4 is a diagram showing still another exemplary game screen.
Figure 5:
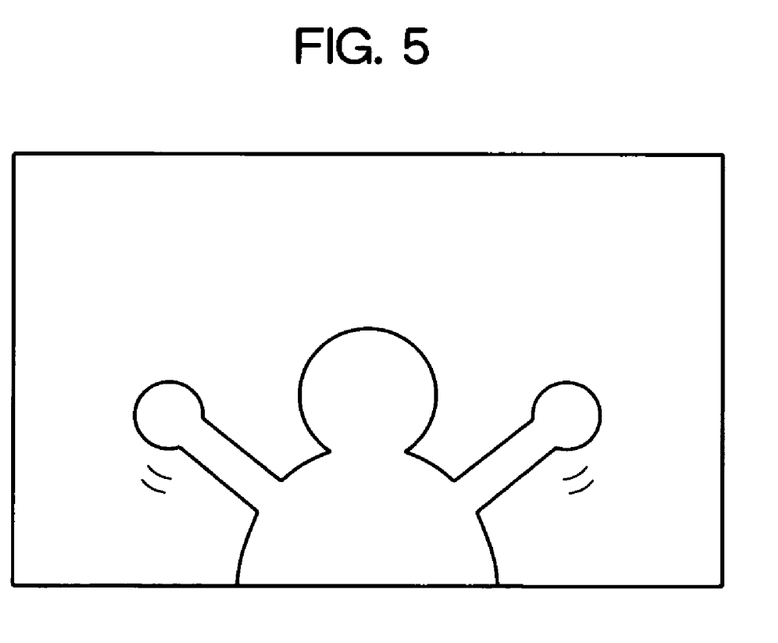
FIG. 5 is a diagram showing an exemplary image of a player.
Figure 6:
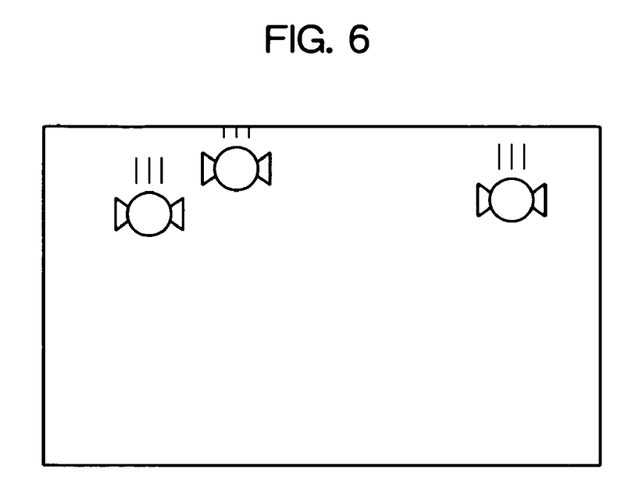
FIG. 6 is a diagram showing an exemplary basic game image.

FIGS. 2 to 4 each show an exemplary game screen to be displayed on the home television receiver 40. The game screen of the FIG. 2 example is a combination result of an image (moving image) of the player P of FIG. 5 captured by the camera unit 42, and a basic game image of FIG. 6 showing falling candies. The basic game image is generated by execution of two-dimensional (2D) or three-dimensional (3D) image processing on a predetermined time basis, e.g., for every $1/60^{th}$ of a second. In this game, the player P can get a candy by moving their hands at the corresponding position of the candy. The game score is calculated depending on how many candies are obtained.

The game screen of the FIG. 3 example is a combination result of an image (moving image) of the player P captured by the camera unit 42, and a basic game image showing falling balloons. The basic game image is generated by execution of 2D or 3D image processing on a predetermined time basis, e.g., for every $1/60^{th}$ of a second. In this game, the player P moves to position his/her head beneath a balloon, and then moves his/her head so that the balloon bounces up. The game score is calculated depending on how many balloons are bounced up.

The game screen of the FIG. 4 example is a combination result of an image (moving image) of the player P captured by the camera unit 42, and a basic game image showing missiles moving from right to left in the drawing. The basic game image is generated by execution of 2D or 3D image processing on a predetermined time basis, e.g., for every $1/60^{th}$ of a second. In this game, the player P can fire a missile by moving his/her hands at the corresponding position of the missile. The game score is calculated depending on how many missiles are fired.

As such, a plurality types of game are available in the game device 10, and before game play, the home television receiver 40 displays a reference image for the player to select any preferred game. In response, the selected game is activated.

Figure 7:
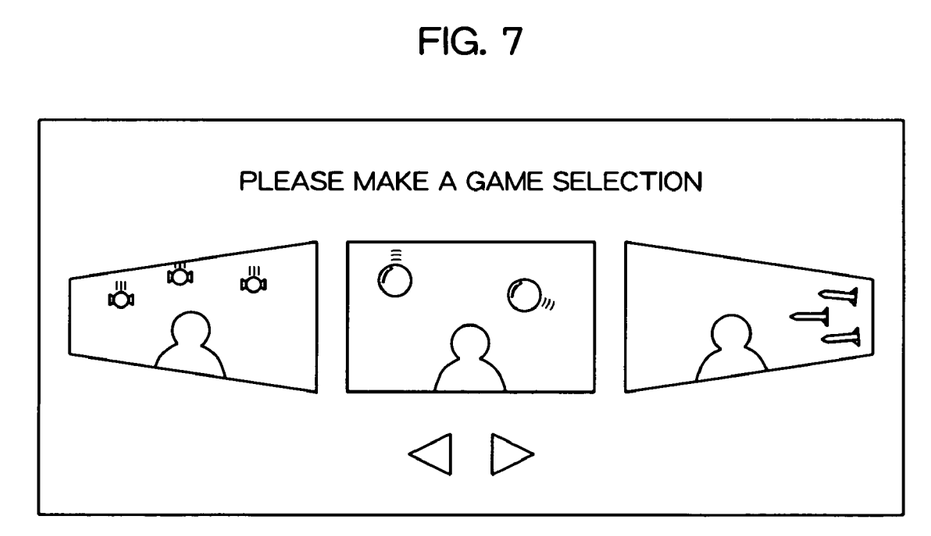
FIG. 7 is a diagram showing an exemplary reference screen.

FIG. 7 shows an exemplary reference image (reference screen). As is shown in the drawing, the reference image includes three reference game images, i.e., one reference game image at the center, and two others on either side which are modified versions of the reference game image. These reference game images correspond to the game screens of FIGS. 2 to 4, respectively. To be more specific, these reference game images are combination results of an image of the player P to be captured in real time and the reference basic game images (still images) respectively corresponding to the game screens of FIGS. 2 to 4. That is, in the present embodiment, the basic game image is previously generated sequentially for each of the games in another computer, and one resultant image is stored in the game device 10 as a reference basic game image. This reference basic game image is read out for combination with the image of the player P, and the result is a reference game image. Note here that the reference basic game image is assumed as a still image, but animated images are also possible. This makes it possible for the player to understand how the game actually proceeds.

Figure 9A:
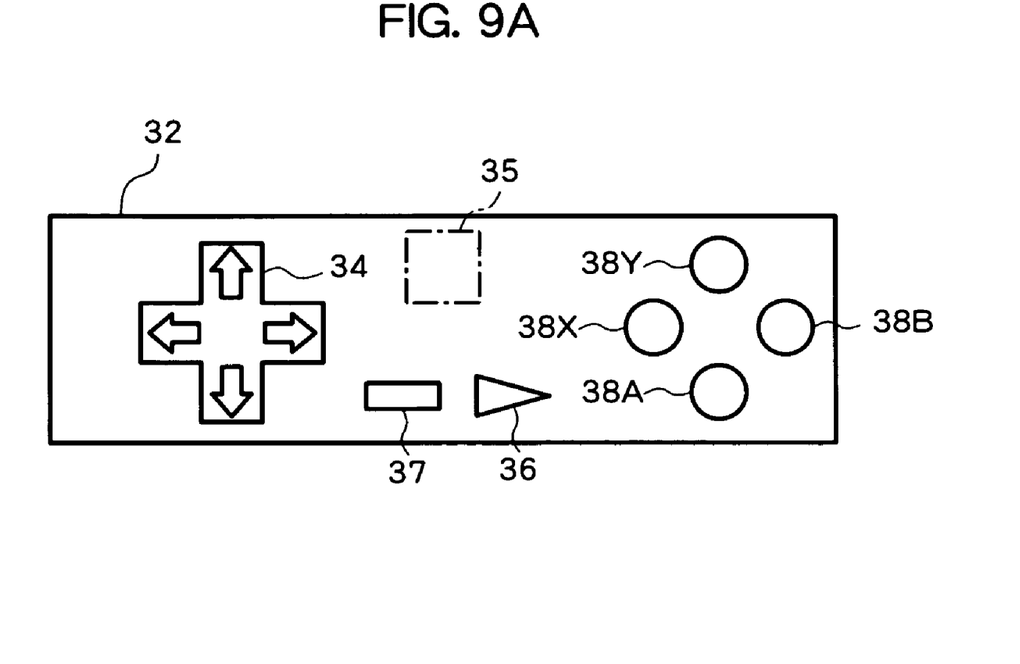
FIGS. 9A and 9B are both a diagram showing the outer appearance of the game device.

In the reference screen, any arbitrary reference basic game image is moved to the center by the player using a direction key 34 provided on a controller 32 (refer to FIG. 9). With the image centered, the player depresses a determination button, e.g., button 38, provided on the controller 32 and as a result the game corresponding to the centered reference game image is reactivated.

The hardware structure of the game device 10 will now be described.

Figure 8:
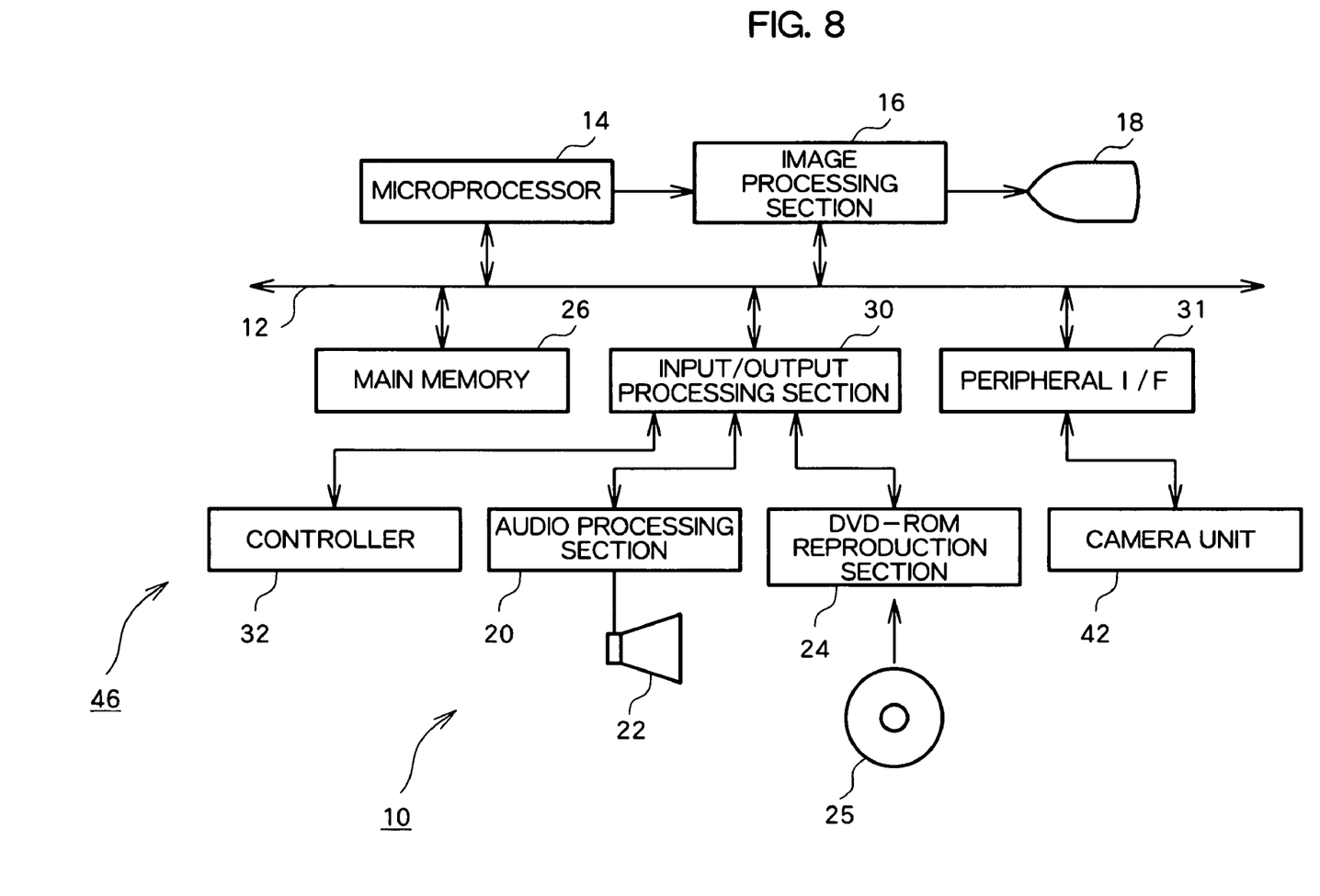
FIG. 8 is a diagram showing the hardware structure of the game device.

FIG. 8 is a diagram showing the hardware structure of the game device 10. As is shown in the drawing, the game device 10 is so structured that the home game unit 46 is attached with a DVD (Digital Versatile Disk)-ROM 25 serving as an information storage medium. Herein, the home game unit 46 is connected to both a monitor 18 and a speaker 22. In this example, the DVD-ROM 25 supplies game programs and game data to the home game unit 46. Alternatively, any other types of computer-readable information storage media are applicable, e.g., CD-ROM (Compact Disk-Read Only Memory), ROM (Read Only Memory) cartridge, or others. Further, a data communications network exemplified by the Internet may be applied to remotely supply game programs and game data to the home game unit 46.

The home game unit 46 is a computer game system, provided with a microprocessor 14, an image processing section 16, a main memory 26, an input/output processing section 30, a peripheral interface 31, an audio processing section 20, and a DVD-ROM reproduction section 24. The components of the microprocessor 14, the image processing section 16, the main memory 26, the input/output processing section 30, and the peripheral interface 31 are connected together through a bus 12 for mutual data communication. The input/output processing section 30 is connected with the components of the controller 32, the audio processing section 20, and the DVD-ROM reproduction section 24. The peripheral interface 31 is connected with the camera unit 42. These components of the home game unit 46 are all accommodated in a cabinet. In this example, the home television receiver 40 serves as the monitor 18, and the speaker 22 is the speaker that is internally equipped in the home television receiver 40.

The microprocessor 14 exercises control over the components of the home game unit 46 based on an operating system or a game program. The operating system is stored in ROM that is not shown, and the game program is read from the DVD-ROM 25. The bus 12 serves for address and data exchange among the components of the home game unit 46. The main memory 26 contains the game program and game data read from the DVD-ROM 25 whenever needed. The main memory 26 is used also as a working area for the microprocessor 14. The image processing section 16 includes VRAM (Video Random Access Memory), and receives image data coming from the microprocessor 14 for rendering of game screens in the VRAM. At the time of such screen rendering, the image processing section 16 also converts the screen details into video signals for output to the monitor 18.

The input/output processing section 30 serves as an interface for the microprocessor 14 to access the components of the controller 32, the audio processing section 20, and the DVD-ROM reproduction section 24. The controller 32 serves as generalized or specifically-designed operation input means for the player to go through various game operations. The audio processing section 20 includes a sound buffer. Data such as game music, game effects audio, and audio messages read out from the DVD-ROM 25 is stored in the sound buffer and then reproduced and output from the speaker 22. The DVD-ROM reproduction section 24 responds to an instruction from the microprocessor 14 to read the game program and game data stored in the DVD-ROM 25. The peripheral interface 31 is used to connect various peripheral devices to the home game unit 46, and is exemplified by a USB (Universal Serial Bus) interface. In this example, the peripheral interface 31 is connected with the camera unit 42, which is a well-known digital camera for supplying color images to the home game unit 46 at predetermined intervals, e.g., every 1/60 second. This camera unit 42 is placed on the home television receiver 40, and the lens thereof is directed toward the player P to capture their image.

Figure 9B:
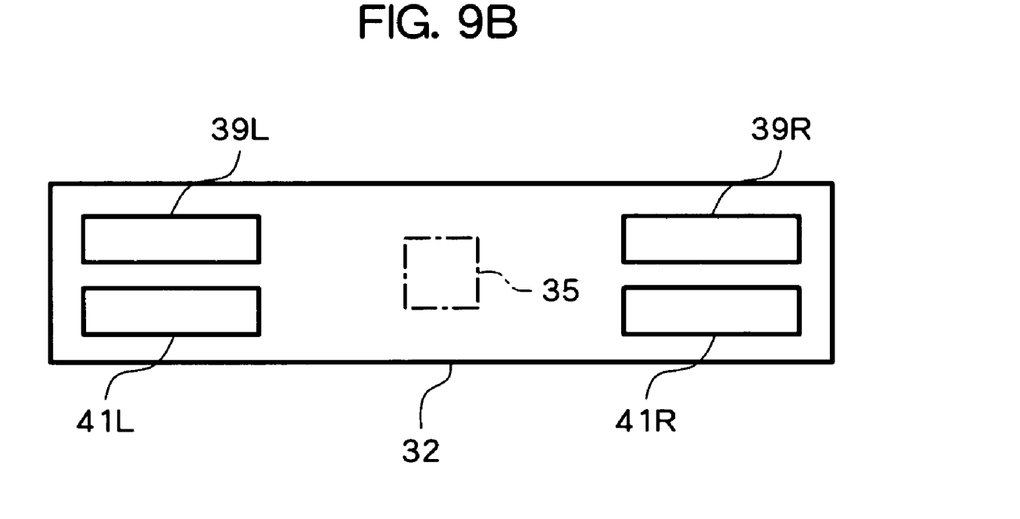

FIGS. 9A and 9B are diagrams showing an exemplary controller 32. The controller 32 in the drawing is a general game controller. As shown in FIG. 9A, on the top surface of the controller 32, there are provided the direction key 34, a start key 36, a selection key 37, and buttons 38X, 38Y, 38A, and 38B. As shown in FIG. 9B, on the rear surface of the controller 32, buttons 39L, 39R, 41L, and 41R are provided. Specifically, the buttons 41L and 41R on the rear surface are located closer to the top surface, the button 41L at the left hand side, and the button 41R at the right hand side. The buttons 39L and 39R are located closer to the bottom surface, the button 39L at the left hand side, and the 39R at the right hand side. The direction key 34 is in the shape of a cross, and is generally used to direct which direction characters and a cursor move in. The start key 36 is a small-sized push button in the shape of a triangle, and is generally used to start, interrupt, or terminate the game. The selection key 37 is generally used to display any given menu screen, for example. The buttons 38X, 38Y, 38A, 38B, 39L, 39R, 41L, and 41R are used for other game operations. The controller 32 includes an oscillator 35, which is exemplified by a piezoelectric element, or a motor with an eccentric weight etc. The oscillator 35 is driven in response to an oscillation-ON instruction from the microprocessor 14 to the controller 32. The oscillator 35 stops operating in response to an oscillation-OFF instruction provided from the microprocessor 14 to the controller 32. In this example, the direction key 34 is used for change of reference game image for display at the center of the reference image, and the button 38B is used to determine which game to play.

Figure 10A:
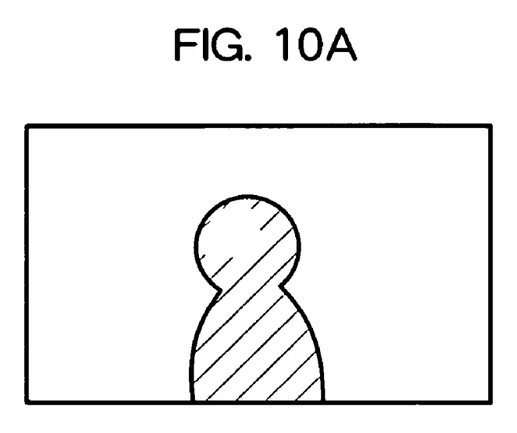
FIGS. 10A to 10C are all a diagram for illustrating a process of detecting an operation input from an image of a player image.
Figure 10B:
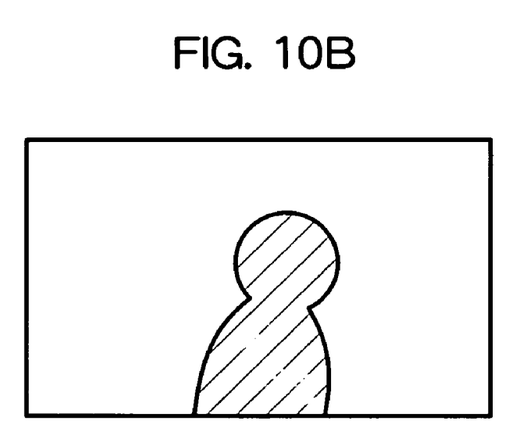
Figure 10C:
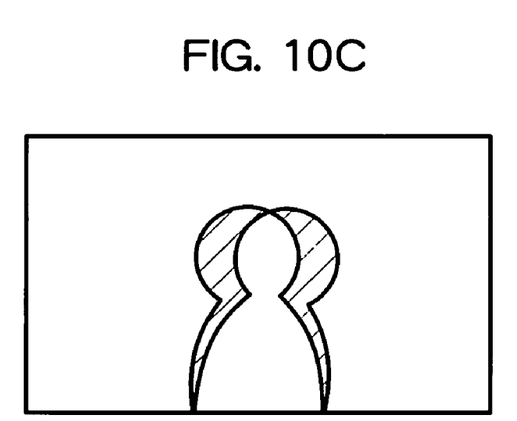

FIGS. 10A and 10B are diagrams showing an exemplary player image to be captured by the camera unit 42, and FIG. 10C is a diagram showing an exemplary differential image to be generated by the home game unit 46. To be specific, FIG. 10A shows the most recent image, FIG. 10B shows an image immediately preceding the image of FIG. 10A, and FIG. 10C shows a differential image of the images of FIGS. 10A and 10B. The image of FIG. 10C shows the player P swaying sideways, from right to left, in front of the camera unit 42. The differential image of FIG. 10C is of the same size as the player images of FIGS. 10A and 10B. Pixels in the player image are each provided with a pixel value (color information), and in the differential image of FIG. 10C, if any pixel corresponding to that in the player image (pixel having the same address) shows some difference, an absolute value of the difference is provided to the pixel as its pixel value. Accordingly, for a region showing no difference of display contents between the latest image and the preceding image, i.e., a region showing no image movement, the pixels in the region have pixel values of 0. For a region showing some difference of display contents between the latest image and the preceding image, i.e., a region showing some image movement, the pixels in the region have pixel values of 1 or more. Assuming here that the player P is dressed in plain-colored clothes, FIG. 10C shows the case in which no difference is observed for the part of the player P's body (clothes) between the latest image and the preceding image.

In the game device 10, a differential image is generated for the latest image and the preceding image at predetermined intervals, e.g., for every 1/60 second. As to the pixels of the resulting differential image, the pixel values are partially or entirely added together to calculate a player movement amount. The calculated player movement amount is summed up for every differential image, and the game is controlled depending on whether or not the sum value (total player movement amount) exceeds a predetermined threshold value in a predetermined length of time. For example, with the game of FIG. 2 example, for any regions corresponding to the positions of falling candies, pixel values are added together to calculate the player movement amount. When the sum value exceeds a predetermined threshold value in a predetermined length of time, the corresponding candy is obtained by the player P.

Figure 11:
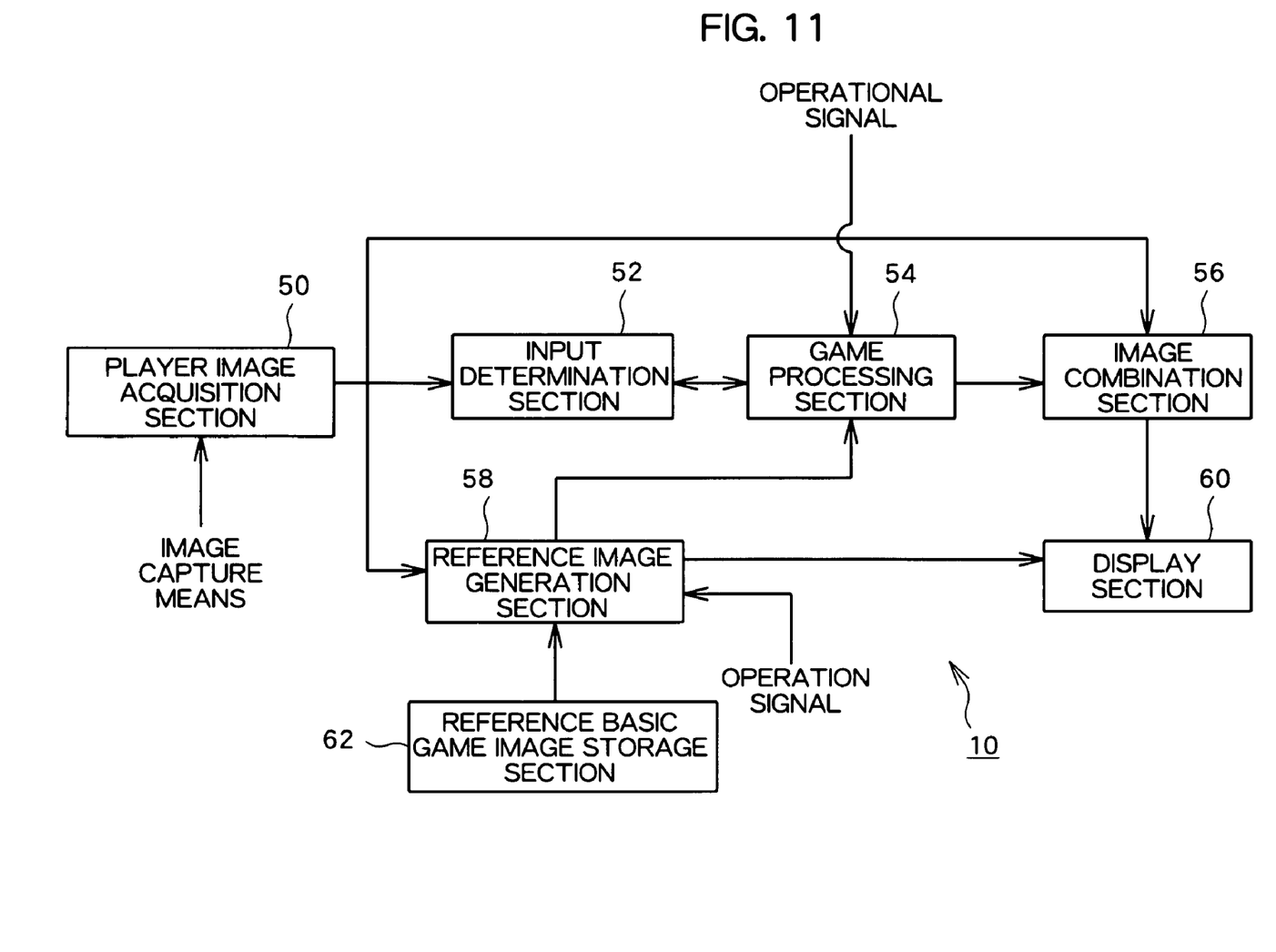
FIG. 11 is a functional block diagram of the game device of the embodiment of the present invention.

FIG. 11 is a functional block diagram of the game device 10. As is shown in the drawing, in view of function, the game device 10 includes a player image acquisition section 50, an input determination section 52, a game processing section 54, an image combination section 56, a reference image generation section 58, a display section 60, and a reference basic game image storage section 62. These components are implemented by the home game unit 46 executing a program stored in the DVD-ROM 25.

First of all, the player image acquisition section 50 acquires an image of the player P captured by the camera unit 42, and forwards the image to the input determination section 52, the image combination section 56, and the reference image generation section 58. Based on the player image provided by the player image acquisition section 50, the input determination section 52 determines the details of an operation input made by the player P, and this process can be understood by referring to FIGS. 10A to 10C. The determination result is forwarded to the game processing section 54. In a case where the player image is only partially used for determination, a region instruction is provided from the game processing section 54. With respect to the instructed region, a determination is made for the details of an operation input made by the player P as shown in FIGS. 10A to 10C.

The game processing section 54 exercises control over the game in accordance with an operation signal coming from the controller 32, and the details of the operation input made by the input determination section 52. Through this type of control, the game processing section 54 generates a basic game image by 2D or 3D image processing at predetermined intervals, e.g., every 1/60 second. The resulting basic game image is forwarded to the image combination section 56. The game processing section 54 is capable of activating a plurality of types of game. In each of the games, a game image as a combination result of the image of the player P captured by the camera unit 42 and the basic game image corresponding to the game is output and displayed. The reference image generation section 58 issues a game type instruction toward the game processing section 54, which accordingly determines any target game for game processing, i.e., the game for the player to play.

The image combination section 56 is provided with the image of the player P from the player image acquisition section 50 as described in the foregoing, and therein, the image of the player P and the basic game image are combined together in real time. Specifically, the image of the player P coming from the player image acquisition section 50 is updated at predetermined intervals, and the basic game image coming from the game processing section 54 is also updated at predetermined intervals. In the image combination section 56, these images are combined together at predetermined intervals, and the result is forwarded to the display section 60 as a game image. In the display section 60, the game image arriving at predetermined intervals is output to the monitor 18 for display thereon.

In the reference image generation section 58, the image of the player P captured by the camera unit 42 is combined together with a reference basic game image for some games from those available (three in FIG. 7 example). The results of such image combination are reference game images, and a reference image including the reference game images is forwarded to the display section 60. The reference basic game image is stored in the reference basic game image storage section 62 in advance for every game, and an operation signal coming from the controller 32 determines which three reference basic game images are to be read out. The read-out reference basic game images are each combined with the image of the player P coming from the player image acquisition section 50, and the resulting images are placed at their respective given positions to generate a reference image. At this time, anyone specific image of the player P is combined with the reference basic game images. The resulting reference image is forwarded to the display section 60, and the display section 60 outputs the image for display on the monitor 18.

In the reference image, an operation signal coming from the controller 32 determines which image (image as a combination result of the reference basic game image and the image of the player P) is to be placed at the center, and the remaining images are placed and displayed on the sides of the centered image. As such, the player P displays their preferred game at the center of the reference screen using the operation signal, and depresses any given button on the controller 32, e.g., the button 38B. In response, a game type instruction is sent to the game processing section 54 to activate the game corresponding to the image at the center.

The reference basic game image storage section 62 is provided with storage means exemplified by the DVD-ROM 25 or the main memory 26, and stores the reference basic game image for every game type. The reference basic game image is one of the basic game images which are to be generated sequentially (in real time) by the 2D or 3D image processing in the game processing section 54. As such, by generating and storing only one basic game image in advance in another computer as a reference basic game image by 2D or 3D image processing in real time, a plurality of reference game images can be included in a reference image with a very light processing load.

According to the game device 10 described above, a reference basic game image similar to a basic game image to be sequentially generated in the game processing section 54 is stored in advance in the reference basic game image storage section 62. The stored reference basic game image is read out for combination with the image of the player P, and the resulting image is output for display. Accordingly, the reference image can be displayed with a very light processing load. What is more, a reference basic game image corresponding to the basic game image for actual use is combined with the image of the player P to be captured by the camera unit 42, and the resulting image is displayed. The player can therefore easily understand the play requirements relating to image capturing on a game basis.

Note here that the present invention is not restricted to the above described embodiment.

For example, instead of displaying three reference game images in a reference image, reference game images corresponding to games that can be processed in the game processing section 54 may be displayed all at once. Moreover, the basic game image to be generated by the game processing section 54 is not necessarily the same as the reference basic game image to be stored in the reference basic game image storage section 62. Alternatively, any image not entirely displaying the contents found in the basic game image, e.g., score display, may be regarded as a reference basic game image.

What is claimed is:

1. A game device, comprising:

image capture means for capturing images of a player in real time at predetermined intervals;

reference game image generation means for generating a plurality of reference game images for each of various available games by combining, at the predetermined real time intervals, the captured images of the player with reference basic game images which correspond to at least a part of each of the various available games;

reference image output means for outputting and displaying a reference image comprising a simultaneous display of a specified number of the plurality of reference game images, each reference game image corresponding to one of the various available games, as a preview image to aid in game selection;

specification means for specifying one of the plurality of reference game images included in the reference image; and game execution means for executing the various available games, and for each of the various available games, outputting and displaying a game image as a combination of the captured image of the player and a basic game image corresponding to the game, wherein the game execution means executes one of the various available games corresponding to the specified reference game image, the reference basic game image is generated based on a basic game image, and the reference game image generation means includes reference basic game image storage means for storing the generated reference basic game images, and combines the captured image of the player and the reference basic game images stored in the reference basic game image storage means.

2. The game device according to claim 1, wherein the game execution means includes means for sequentially generating the basic game image by two-dimensional or three-dimensional image processing, and in the reference basic game image storage means, at least one of the basic game images to be sequentially generated by the generation means is generated in advance, and stored as the reference basic game image.

3. The game device according to any one of claim 1, wherein the image capture means captures moving images of the player.

4. A computer control method, comprising:

capturing an images of a player in real time at predetermined intervals;

generating a plurality of reference game images for each of various available games by combining, at the predetermined real time intervals, the captured images of the player with reference basic game images which correspond to at least a part of each of the various available games;

outputting and displaying a reference image comprising a simultaneous display of a specified number of the plurality of reference game images, each reference game image corresponding to one of the various available games, as a preview image to aid in game selection;

specifying one of the plurality of reference game images included in the reference image; and executing a game selected from the various available games, and for each of the various available games, outputting and displaying a game image as a combination of the captured image of the player and a basic game image corresponding to the game, wherein one of the various available games corresponding to the specified reference game image is executed, the reference basic game image is generated based on a basic game image, the generated reference basic game images are stored, and the captured image of the player is combined with the stored reference basic game images.

5. A computer-readable information storage medium storing a program for activating a computer, the program operating as:

reference game image generation means for generating a plurality of reference game images for each of various available games by combining, in real time at predetermined intervals, images of a player captured at the predetermined real time intervals by image capture means with reference basic game images which correspond to at least a part of each of the various available games;

reference image output means for outputting and displaying a reference image comprising a simultaneous display of a specified number of the plurality of reference game images, each reference game image corresponding to one of the various available games, as a preview image to aid in game selection;

specification means for specifying one of the plurality of reference game images included in the reference image; and game execution means for executing the various available games, and for each of the various available games, outputting and displaying a game image as a combination of the captured image of the player and a basic game image corresponding to the game;

wherein the game execution means executes one of the various available games corresponding to the specified reference game image, the reference basic game image is generated based on a basic game image, and the reference game image generation means includes reference basic game image storage means for storing the generated reference basic game images, and combines the captured image of the player and the reference basic game images stored in the reference basic game image storage means.

* * * * *